US012746532B2

(12) United States Patent
Vjunov et al.

(10) Patent No.: US 12,746,532 B2
(45) Date of Patent: Sep. 29, 2026

(54) LAYERED TRI-METALLIC CATALYTIC ARTICLE AND METHOD OF MANUFACTURING THE CATALYTIC ARTICLE

(71) Applicant: BASF MOBILE EMISSIONS CATALYSTS LLC, Iselin, NJ (US)

(72) Inventors: Aleksei Vjunov, Iselin, NJ (US); Michel Deeba, East Brunswick, NJ (US); Xiaolai Zheng, Iselin, NJ (US); Patrick L. Burk, Freehold, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 955 days.

(21) Appl. No.: 17/593,395

(22) PCT Filed: Mar. 18, 2020

(86) PCT No.: PCT/US2020/023256
§ 371 (c)(1),
(2) Date: Sep. 17, 2021

(87) PCT Pub. No.: WO2020/190994
PCT Pub. Date: Sep. 24, 2020

(65) Prior Publication Data

US 2022/0193639 A1 Jun. 23, 2022

Related U.S. Application Data

(60) Provisional application No. 62/819,695, filed on Mar. 18, 2019.

(30) Foreign Application Priority Data

Apr. 16, 2019 (EP) .................................... 19169497

(51) Int. Cl.
*B01J 23/46* (2006.01)
*B01D 53/94* (2006.01)
(Continued)

(52) U.S. Cl.
CPC .......... *B01J 23/464* (2013.01); *B01D 53/945* (2013.01); *B01D 53/9468* (2013.01);
(Continued)

(58) Field of Classification Search
CPC . B01J 23/464; B01J 21/04; B01J 21/16; B01J 23/02; B01J 23/10; B01J 23/44;
(Continued)

(56) References Cited

U.S. PATENT DOCUMENTS 8,039,418 B2 10/2011 Kitamura et al.
8,828,343 B2 * 9/2014 Liu .......................... B01J 23/63 502/262

(Continued)

FOREIGN PATENT DOCUMENTS

EP 1063779 A1 11/2000
EP 1704910 A2 9/2006

(Continued)

OTHER PUBLICATIONS

European Search Report for EP Patent Application No. 20773625.7, Issued on Nov. 24, 2022, 4 pages.

(Continued)

*Primary Examiner* — Anthony J Zimmer
*Assistant Examiner* — Logan Laclair
(74) *Attorney, Agent, or Firm* — DLA Piper LLP (US)

(57) ABSTRACT

The present invention provides a tri-metallic layered catalytic article comprising a first layer comprising palladium supported on at least one of an oxygen storage component, and an alumina component; a second layer comprising platinum and rhodium, each supported on at least one of an (Continued)

oxygen storage component and a zirconia component; and a substrate, wherein the weight ratio of palladium to platinum is in the range of 1.0:0.4 to 1:2. The present invention also provides a process for preparing the tri-metallic layered catalytic article, an exhaust system for internal combustion engine and use of the tri-metallic layered catalytic article for purifying a gaseous exhaust stream.

18 Claims, 7 Drawing Sheets

(51) Int. Cl.

| | |
|---|---|
| ***B01J 21/04*** | (2006.01) |
| ***B01J 21/16*** | (2006.01) |
| ***B01J 23/02*** | (2006.01) |
| ***B01J 23/10*** | (2006.01) |
| ***B01J 23/44*** | (2006.01) |
| ***B01J 35/00*** | (2024.01) |
| ***B01J 35/56*** | (2024.01) |
| ***B01J 37/03*** | (2006.01) |
| ***B01J 37/08*** | (2006.01) |
| ***F01N 3/10*** | (2006.01) |
| ***F01N 3/28*** | (2006.01) |

(52) U.S. Cl.
CPC .......... *B01D 53/9477* (2013.01); *B01J 21/04* (2013.01); *B01J 21/16* (2013.01); *B01J 23/02* (2013.01); *B01J 23/10* (2013.01); *B01J 23/44* (2013.01); *B01J 35/19* (2024.01); *B01J 35/56* (2024.01); *B01J 37/038* (2013.01); *B01J 37/082* (2013.01); *F01N 3/101* (2013.01); *F01N 3/2803* (2013.01); *B01D 2255/1021* (2013.01); *B01D 2255/1023* (2013.01); *B01D 2255/1025* (2013.01); *B01D 2255/2042* (2013.01); *B01D 2255/2065* (2013.01); *B01D 2255/908* (2013.01); *F01N 3/2842* (2013.01); *F01N 2370/02* (2013.01)

(58) Field of Classification Search
CPC . B01J 35/19; B01J 35/56; B01J 37/038; B01J 37/082; B01J 37/0244; B01J 37/0248; B01D 53/945; B01D 53/9468; B01D 53/9477; B01D 2255/1021; B01D 2255/1023; B01D 2255/1025; B01D 2255/2042; B01D 2255/2065; B01D 2255/908; F01N 3/101; F01N 3/2803; F01N 3/2842; F01N 2370/02; F01N 3/2828; F01N 2510/0684; F01N 2330/02
See application file for complete search history.

(56) References Cited

U.S. PATENT DOCUMENTS

| | | | | |
|---|---|---|---|---|
| 2005/0282701 | A1 | 12/2005 | Foong et al. | |
| 2006/0251549 | A1 | 11/2006 | Kumar et al. | |
| 2010/0215557 | A1 | 8/2010 | Liu et al. | |
| 2012/0180464 | A1 | 7/2012 | Wei et al. | |
| 2015/0217285 | A1 | 8/2015 | Wille et al. | |
| 2018/0178198 | A1 * | 6/2018 | Deeba ...................... | B01J 35/56 |

FOREIGN PATENT DOCUMENTS

| | | | | |
|---|---|---|---|---|
| EP | 1053779 | B1 * | 4/2007 | ........... B01D 53/945 |
| WO | WO-95/35152 | A1 | 12/1995 | |
| WO | WO-98/24535 | A1 | 6/1998 | |
| WO | WO-2011/109676 | A2 | 9/2011 | |

OTHER PUBLICATIONS

International Search Report dated Jul. 8, 2020, PCT/US2020/023256.
European Search Report for EP Patent Application No. 19169497.5, Issued on Oct. 16, 2019, 3 pages.
Heck, et al., "The Preparation of Catalytic Materials: Carriers, Active Components and Monolithic Substrates". Catalytic Air Pollution Control: Commercial Technology, 2nd Edition, Jul. 24, 2002, pp. 18-19.

* cited by examiner

LAYERED TRI-METALLIC CATALYTIC ARTICLE AND METHOD OF MANUFACTURING THE CATALYTIC ARTICLE

CROSS-REFERENCE TO RELATED APPLICATIONS

This application is a national stage filing under 35 U.S.C. § 371 of International Application No. PCT/US2020/023256, filed on Mar. 18, 2020, which claims priority to U.S. Provisional Application No. 62/819,695, filed on Mar. 18, 2019, and European Application 19169497.5, filed on Apr. 16, 2019; the contents of each application is incorporated herein by reference in its entirety.

FIELD OF THE INVENTION

The presently claimed invention relates to a layered catalytic article useful for the treatment of the exhaust gases to reduce contaminants contained therein. Particularly, the presently claimed invention relates to the layered tri-metallic catalytic article and a method of preparing the catalytic article.

BACKGROUND OF THE INVENTION

Three-way conversion (TWC) catalysts (hereinafter interchangeably referred to as three-way conversion catalyst, three-way catalyst, TWC Catalyst, and TWC) have been utilized in the treatment of the exhaust gas streams from the internal combustion engines for several years. Generally, in order to treat or purify the exhaust gas containing pollutants such as hydrocarbons, nitrogen oxides, and carbon monoxide, catalytic converters containing a three-way conversion catalyst are used in the exhaust gas line of an internal combustion engine. The three-way conversion catalyst is typically known to oxidize unburnt hydrocarbon and carbon monoxide and reduce nitrogen oxides.

Typically, most of the commercially available TWC catalysts contain palladium as a major platinum group metal component which is used along with a lesser amount of rhodium. It is possible that a palladium supply shortage may arise in the market in upcoming years since a large amount of palladium is used for the fabrication of catalytic converters that help to reduce the exhaust gas pollutant amounts. Currently, palladium is approximately 20-25% more expensive than platinum. At the same time, the platinum prices are expected to decrease due to decreasing demand of platinum. One of the reasons could be the decreasing production volumes of diesel-powered vehicles.

Accordingly, it is desired to replace a portion of palladium with platinum in the TWC catalyst in order to reduce the cost of the catalyst substantially. However, the proposed approach is complicated by the need to maintain or improve the desired efficacy of the catalyst, which may not be possible by simply replacing a portion of palladium with platinum.

Thus, the focus of the presently claimed invention is to provide a catalyst in which about 50% of the palladium is substituted with platinum without the overall catalyst performance decrease as described by comparison of the individual CO, HC and $NO_x$ conversion levels as well as the summary tail pipe emission of non-methane hydrocarbon (NMHC) and nitrous oxides ($NO_x$), which is one of the key requirements for vehicle certification by regulatory bodies of the majority of jurisdictions.

SUMMARY OF THE INVENTION

The presently claimed invention provides a tri-metallic (Pt/Pd/Rh) layered catalytic article comprising a first layer comprising palladium supported on at least one of an oxygen storage component and an alumina component; a second layer comprising platinum and rhodium, each supported on at least one of an oxygen storage component, and a zirconia component; and a substrate, wherein the weight ratio of palladium to platinum is in the range of 1.0:0.4 to 1.0:2.0, wherein the first layer is deposited on the substrate and the second layer is deposited on the first layer. In one embodiment, the weight ratio of palladium to platinum is in the range of 1.0:0.7 to 1.0:1.3. In one embodiment, the weight ratio of palladium to platinum to rhodium is in the range of 1.0:0.7:0.1 to 1.0:1.3:0.3.

In one embodiment, the first layer is essentially free of platinum and rhodium. In one embodiment, the second layer may further comprise palladium supported on an alumina component.

In another aspect the presently claimed invention provides a process for the preparation of a layered catalytic article, wherein said process comprises preparing a first layer slurry; depositing the first layer slurry on a substrate to obtain a first layer; preparing a second layer slurry; and depositing the second layer slurry on the first layer to obtain a second layer followed by calcination at a temperature ranging from 400 to 700° C., wherein the step of preparing the first layer slurry or second layer slurry comprises a technique selected from incipient wetness impregnation, incipient wetness co-impregnation, and post-addition.

The presently claimed invention in still another aspect provides an exhaust system for internal combustion engines, said system comprising a layered catalytic article of the present invention.

The presently claimed invention also provides a method of treating a gaseous exhaust stream comprising hydrocarbons, carbon monoxide, and nitrogen oxide, the method comprising contacting said exhaust stream with a layered catalytic article or an exhaust system according to the present invention. The presently claimed invention further provides a method of reducing hydrocarbons, carbon monoxide, and nitrogen oxide levels in a gaseous exhaust stream, the method comprising contacting the gaseous exhaust stream with a layered catalytic article or an exhaust system according to the present invention to reduce the levels of hydrocarbons, carbon monoxide, and nitrogen oxide in the exhaust gas.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only and should not be construed as limiting the invention. The above and other features of the presently claimed invention, their nature, and various advantages will become more apparent upon consideration of the following detailed description, taken in conjunction with the accompanying drawings:

DETAILED DESCRIPTION

Figure 1A:
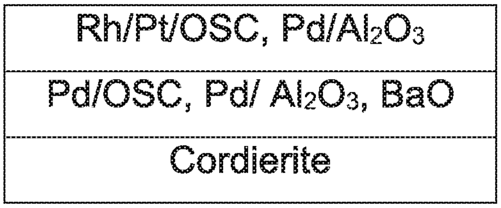
FIG. 1 is a schematic representation of catalytic article designs in exemplary configurations according to some embodiments of the presently claimed invention.

The presently claimed invention now will be described more fully hereafter. The presently claimed invention may be embodied in many different forms and should not be construed as limited to the embodiments set forth herein; rather, these embodiments are provided so that this presently claimed invention will be thorough and complete, and will fully convey the scope of the invention to those skilled in the art. No language in the specification should be construed as indicating any non-claimed element as essential to the practice of the disclosed materials and methods.

The use of the terms "a", "an", "the", and similar referents in the context of describing the materials and methods discussed herein (especially in the context of the following claims) are to be construed to cover both the singular and the plural, unless otherwise indicated herein or clearly contradicted by context.

The term "about" used throughout this specification is used to describe and account for small fluctuations. For example, the term "about" refers to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

All methods described herein can be performed in any suitable order unless otherwise indicated herein or otherwise clearly contradicted by context. The use of any and all examples, or exemplary language (e.g., "such as") provided herein, is intended merely to better illustrate the materials and methods and does not pose a limitation on the scope unless otherwise claimed.

The present invention provides a tri-metallic layered catalytic article comprising three platinum group metals (PGM) in which a high amount of platinum can be used to substitute palladium substantially.

The platinum group metal (PGM) refers to any component that includes a PGM (Ru, Rh, Os, Ir, Pd, Pt and/or Au). For example, the PGM may be in a metallic form, with zero valence, or the PGM may be in an oxide form. Reference to "PGM component" allows for the presence of the PGM in any valence state. The terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, usually the metal or the metal oxide.

In one embodiment, palladium and platinum are provided in separate layers to avoid formation of an alloy that could under certain conditions limit catalyst efficacy. The alloy formation can lead to core-shell structure formation and/or excessive PGM stabilization and/or sintering. Best performance of catalytic article is found when palladium is provided in the bottom layer, and platinum and rhodium in the top layer, i.e. physical separation of platinum and palladium in different washcoat layers allowed improved performance. In another embodiment, platinum and palladium are provided in the same layer, e.g. a top layer, wherein either platinum or palladium or both are thermally or chemically fixed on the supports prior to slurry preparation. In the context of the present invention the term "first layer" is interchangeably used for "bottom layer" or "bottom coat", whereas the term "second layer" is interchangeably used for "top layer" or "top coat". The first layer is deposited on a substrate and the second layer is deposited on the first layer.

The term "catalyst" or "catalytic article" or "catalyst article" refers to a component in which a substrate is coated with catalyst composition which is used to promote a desired reaction. In one embodiment, the catalytic article is a layered catalytic article. The term layered catalytic article refers to a catalytic article in which a substrate is coated with a PGM composition(s) in a layered fashion. These composition(s) may be referred to as washcoat(s).

The term "$NO_x$" refers to nitrogen oxide compounds, such as NO and/or $NO_2$.

The platinum group metal(s) is supported or impregnated on a support material such as an alumina component and an oxygen storage component. As used herein, "impregnated" or "impregnation" refers to permeation of the catalytic material into the porous structure of the support material.

A "support" in a catalytic material or catalyst composition or catalyst washcoat refers to a material that receives metals (e.g., PGMs), stabilizers, promoters, binders, and the like through precipitation, association, dispersion, impregnation, or other suitable methods. Exemplary supports include refractory metal oxide supports as described herein below.

"Refractory metal oxide supports" are metal oxides including, for example, bulk alumina, ceria, zirconia, titania, silica, magnesia, neodymia, and other materials known for such use, as well as physical mixtures or chemical combinations thereof, including atomically-doped combinations and including high surface area or activated compounds such as activated alumina.

Exemplary combinations of metal oxides include alumina-zirconia, alumina-ceria-zirconia, lanthana-alumina, lanthana-zirconia-alumina, baria-alumina, baria-lanthana-alumina, baria-lanthana-neodymia alumina, and alumina-ceria. Exemplary alumina includes large pore boehmite, gamma-alumina, and delta/theta alumina. Useful commercial alumina used as a starting material in exemplary processes include activated alumina(s), such as high bulk density gamma-alumina, low or medium bulk density large pore gamma-alumina, and low bulk density large pore boehmite and gamma-alumina. Such materials are generally considered as providing durability to the resulting catalyst.

"High surface area refractory metal oxide supports" refer specifically to support particles having pores larger than 20 Å and a wide pore distribution. High surface area refractory metal oxide supports, e.g., alumina support materials, also referred to as "gamma alumina" or "activated alumina," typically exhibit a BET surface area of fresh material in excess of 60 square meters per gram ("m2/g"), often up to about 300 m2/g or higher. Such activated alumina is usually a mixture of the gamma and delta phases of alumina, but may also contain substantial amounts of eta, kappa and theta alumina phases.

Accordingly, the present invention provides a tri-metallic layered catalytic article which comprises a first layer comprising palladium supported on at least one of an oxygen storage component and an alumina component; a second layer comprising platinum and rhodium, each supported on at least one of an oxygen storage component, and a zirconia component; and a substrate, wherein the weight ratio of palladium to platinum is in the range of 1.0:0.4 to 1.0:2.0, wherein the first layer is deposited on the substrate and the second layer is deposited on the first layer.

In one embodiment, the weight ratio of palladium to platinum is in the range of 1:0.7 to 1:1.3. In one illustrative embodiment, the tri-metallic layered catalytic article comprises a first layer comprising palladium supported on at least one of an oxygen storage component and an alumina component; a second layer comprising platinum and rhodium supported on at least one of an oxygen storage component, and a zirconia component; and a substrate, wherein the weight ratio of palladium to platinum is in the range of 1.0:0.7 to 1.0:1.3, wherein the first layer is deposited on the substrate and the second layer is deposited on the first layer.

In one embodiment, the weight ratio of palladium to platinum to rhodium is 1.0:0.7:0.1 to 1.0:1.3:0.3. In one illustrative embodiment, the tri-metallic layered catalytic article comprises a first layer comprising palladium supported on at least one of an oxygen storage component and an alumina component; a second layer comprising platinum and rhodium, each supported on at least one of an oxygen storage component, and a zirconia component; and a substrate, wherein the weight ratio of palladium to platinum to rhodium is in the range of 1.0:0.7:0.1 to 1.0:1.3:0.3, wherein the first layer is deposited on the substrate and the second layer is deposited on the first layer.

In one embodiment, the tri-metallic layered catalytic article comprises a first layer comprising palladium supported on at least one of an oxygen storage component and an alumina component; a second layer comprising platinum and rhodium, each supported on at least one of an oxygen storage component, and a zirconia component; and a substrate, wherein the weight ratio of palladium to platinum is in the range of 1.0:0.4 to 1.0:2.0, wherein the first layer is deposited on the substrate and the second layer is deposited on the first layer, wherein the first layer comprises 80 to 100 wt. % of palladium with respect to the total weight of palladium present in the catalytic article.

In one embodiment, the tri-metallic layered catalytic article comprises a first layer comprising palladium supported on at least one of an oxygen storage component and an alumina component; a second layer comprising platinum and rhodium, each supported on at least one of an oxygen storage component, and a zirconia component; and a substrate, wherein the weight ratio of palladium to platinum is in the range of 1.0:0.4 to 1.0:2.0, wherein the first layer is deposited on the substrate and the second layer is deposited on the first layer, wherein the first layer is essentially free of platinum and rhodium. As used herein the term "essentially free of platinum and rhodium" refers to no external addition of platinum and rhodium in the first layer, however they may optionally be present as a fractional amount <0.001%.

In one embodiment, the first layer comprises at least one alkaline earth metal oxide comprising barium oxide, strontium oxide, or any combination thereof, in an amount of 1.0 to 20 wt. %, based on the total weight of the first layer.

In one embodiment, the tri-metallic layered catalytic article comprises a first layer comprising palladium supported on at least one of an oxygen storage component and an alumina component; a second layer comprising platinum and rhodium, each supported on at least one of an oxygen storage component, and a zirconia component; and a substrate, wherein the weight ratio of palladium to platinum is in the range of 1.0:0.4 to 1.0:2.0, wherein the first layer is deposited on the substrate and the second layer is deposited on the first layer, wherein the second layer further comprises palladium supported on alumina, wherein the amount of palladium is 0.1 to 20 wt. % with respect to the total weight of palladium present in the catalytic article.

In one illustrative embodiment, the tri-metallic layered catalytic article comprises a first layer comprising palladium supported on at least one of an oxygen storage component and an alumina component; a second layer comprising platinum and rhodium, each supported on at least one of an oxygen storage component, and a zirconia component and palladium supported on alumina; and a substrate, wherein the weight ratio of palladium to platinum is in the range of 1.0:0.4 to 1.0:2.0. In one illustrative embodiment, the tri-metallic layered catalytic article comprises a first layer comprising palladium supported on at least one of an oxygen storage component and an alumina component; a second layer comprising platinum and rhodium, each supported on at least one of an oxygen storage component and a zirconia component, and palladium supported on an alumina component; and a substrate, wherein the weight ratio of palladium to platinum is in the range of 1.0:0.7 to 1.0:1.3, wherein the first layer is deposited on the substrate and the second layer is deposited on the first layer.

In one illustrative embodiment, the tri-metallic layered catalytic article comprises a first layer comprising i) palladium supported on at least one of an oxygen storage component and an alumina component, and ii) barium oxide; a second layer comprising platinum and rhodium, each supported on at least one of an oxygen storage component and a zirconia component, and palladium supported on an alumina component; and a substrate, wherein the weight ratio of palladium to platinum is in the range of 1.0:0.7 to 1.0:1.3, wherein the first layer is deposited on the substrate and the second layer is deposited on the first layer.

In one embodiment, the zirconia component comprising at least 70% of zirconia.

In one embodiment, platinum and/or palladium is thermally or chemically fixed.

In one embodiment, the tri-metallic layered catalytic article comprises a first layer comprising palladium supported on at least one of an oxygen storage component and an alumina component; a second layer comprising platinum and rhodium, each supported on at least one of an oxygen storage component and a zirconia component, and palladium supported on an alumina component; and a substrate, wherein the weight ratio of palladium to platinum is in the range of 1.0:0.7 to 1.0:1.3 and platinum and/or palladium present in the second layer is thermally or chemically fixed, wherein the first layer is deposited on the substrate and the second layer is deposited on the first layer.

In one embodiment, the tri-metallic layered catalytic article comprises a first layer loaded with 1.0 to 300 g/ft$^3$ of palladium supported on the alumina component and the oxygen storage component; and a second layer loaded with 1.0 to 100 g/ft$^3$ of rhodium and 1.0 to 300 g/ft$^3$ of platinum, each supported on the oxygen storage component and/or zirconia component, wherein the first layer is deposited on the substrate and the second layer is deposited on the first layer.

In one embodiment, rhodium is used in an amount of 4.0 to 12 g/ft$^3$. In one exemplary embodiment, rhodium is used in an amount of 4 g/ft$^3$. In one embodiment, palladium is used in an amount of 20 to 80 g/ft$^3$. In one exemplary embodiment, palladium is used in an amount of 38 g/ft$^3$. In one embodiment platinum is used in an amount of 20 to 80 g/ft$^3$. In one exemplary embodiment, platinum is used in an amount of 38 g/ft$^3$.

In one illustrative embodiment, the tri-metallic layered catalytic article comprises a first layer comprising palladium supported on the oxygen storage component and alumina component; and a second layer comprising rhodium and platinum supported on the oxygen storage component, and palladium supported on the alumina component, wherein the first layer is deposited on the substrate and the second layer is deposited on the first layer.

In one of the preferred embodiments, the weight ratio of palladium to platinum is 1.0:1.0. In one illustrative embodiment, the tri-metallic layered catalytic article comprises a first layer comprising palladium supported on at least one of an oxygen storage component and an alumina component; a second layer comprising platinum and rhodium supported on at least one of an oxygen storage component, and a zirconia component; and a substrate, wherein the weight ratio of palladium to platinum is in the range of 1.0 to 1.0, wherein the first layer is deposited on the substrate and the second layer is deposited on the first layer.

In another illustrative embodiment, the tri-metallic layered catalytic article comprises a first layer comprising palladium supported on the oxygen storage component and alumina component; and a second layer comprising rhodium and platinum, each supported on the oxygen storage component, and palladium supported on the alumina component, wherein the weight ratio of palladium to platinum is 1.0:1.0, wherein the first layer is deposited on the substrate and the second layer is deposited on the first layer. In another illustrative embodiment, the tri-metallic layered catalytic article comprises a first layer comprising palladium supported on the oxygen storage component and alumina component; and a second layer comprising rhodium and platinum, each supported on the oxygen storage component, and palladium supported on the alumina component, wherein the weight ratio of palladium to platinum is 1.0:1.0, wherein the first layer is deposited on the substrate and the second layer is deposited on the first layer, wherein platinum and/or palladium present in the second layer is thermally or chemically fixed.

In another illustrative embodiment, the tri-metallic layered catalytic article comprises a first layer comprising palladium supported on the oxygen storage component and alumina component, and barium oxide; and a second layer comprising rhodium and platinum, each supported on the oxygen storage component, and palladium supported on the alumina component, wherein the weight ratio of palladium to platinum is 1.0:1.0, wherein the first layer is deposited on the substrate and the second layer is deposited on the first layer.

In another illustrative embodiment, the tri-metallic layered catalytic article comprises a first layer comprising palladium supported on the oxygen storage component and alumina component, and barium oxide; and a second layer comprising rhodium and platinum, each supported on the oxygen storage component, and palladium supported on the alumina component, wherein the weight ratio of palladium to platinum is 1.0:1.0 and platinum and/or palladium present in the second layer is thermally or chemically fixed, wherein the first layer is deposited on the substrate and the second layer is deposited on the first layer.

In still another illustrative embodiment, the tri-metallic layered catalytic article comprises a first layer comprising palladium supported on the oxygen storage component and alumina component; and a second layer comprising rhodium supported on the oxygen storage component and platinum supported on the oxygen storage component wherein the weight ratio of palladium to platinum is 1.0:0.7 to 1.0:1.3 and wherein the first layer is deposited on the substrate and the second layer is deposited on the first layer. In still another illustrative embodiment, the tri-metallic layered catalytic article comprises a first layer comprising palladium supported on the oxygen storage component and alumina component; and a second layer comprising rhodium supported on the oxygen storage component, and platinum supported on the zirconia component wherein the weight ratio of palladium to platinum is 1.0:1.0 and wherein the first layer is deposited on the substrate and the second layer is deposited on the first layer. In yet another illustrative embodiment, the first layer comprises palladium supported on the oxygen storage component and alumina component; and the second layer comprises rhodium supported on the oxygen storage component, and platinum supported on the zirconia component, wherein the weight ratio of palladium to platinum is 1.0:1.0. In a further illustrative embodiment, the tri-metallic layered catalytic article comprises a first layer comprising palladium supported on the oxygen storage component and alumina component, and barium oxide; and a second layer comprising rhodium supported on the oxygen storage component, and platinum supported on the zirconia component, wherein the weight ratio of palladium to platinum is 1.0:1.0, wherein the first layer is deposited on the substrate and the second layer is deposited on the first layer.

In one exemplary embodiment, the tri-metallic layered catalytic article comprises a first layer comprising palladium supported on the both oxygen storage component and alumina component, and barium oxide; and a second layer comprising rhodium and platinum supported on the oxygen storage component, and palladium supported on the alumina component, wherein the weight ratio of palladium to platinum is 1.0:1.0, wherein the first layer is deposited on the substrate and the second layer is deposited on the first layer. In another exemplary embodiment, the tri-metallic layered catalytic article comprises a first layer comprising palladium supported on the both oxygen storage component and alumina component, and barium oxide; and a second layer comprises rhodium supported on the oxygen storage component, and platinum supported on the lanthana-zirconia component, wherein the weight ratio of palladium to platinum is 1.0:1.0, wherein the first layer is deposited on the substrate and the second layer is deposited on the first layer.

In one illustrative embodiment, the tri-metallic layered catalytic article comprises a first layer comprising 30.4 g/$ft^3$ of palladium supported on the both oxygen storage component and alumina component, and barium oxide; and a second layer comprising 4.0 g/$ft^3$ of rhodium and 38 g/$ft^3$ of platinum supported on the oxygen storage component and 7.6 g/$ft^3$ of palladium supported on the alumina component, wherein the first layer is deposited on the substrate and the second layer is deposited on the first layer.

In one illustrative embodiment, the tri-metallic layered catalytic article comprises a first layer comprising 38 g/$ft^3$ of palladium supported on the both oxygen storage component and alumina component, and barium oxide; and a second layer comprising 4 g/$ft^3$ of rhodium supported on the oxygen storage component and 38 g/$ft^3$ of platinum supported on the lanthana-zirconia component, wherein the first layer is deposited on the substrate and the second layer is deposited on the first layer.

As used herein, the term "oxygen storage component" (OSC) refers to an entity that has a multi-valence state and can actively react with reductants such as carbon monoxide (CO) and/or hydrogen under reduction conditions and then react with oxidants such as oxygen or nitrogen oxides under oxidative conditions. Examples of oxygen storage components include ceria composites optionally doped with early transition metal oxides, particularly zirconia, lanthana, praseodymia, neodymia, niobia, europia, samaria, ytterbia, yttria, and mixtures thereof.

In one embodiment, the oxygen storage component utilized in the first and/or the second layer comprises ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, or any combination thereof, wherein the amount of the oxygen storage component is 20 to 80 wt. % based on the total weight of the first or second layer. In one illustrative embodiment, the oxygen storage component comprises ceria-zirconia.

In one embodiment, the alumina component comprises alumina, lanthana-alumina, ceria-alumina, ceria-zirconia-alumina, zirconia-alumina, lanthana-zirconia-alumina, baria-alumina, baria-lanthana-alumina, baria-lanthana-neodymia-alumina, or combinations thereof; wherein the amount of the alumina component is 10 to 90 wt. % based on the total weight of the first or second layer.

In one embodiment, the oxygen storage component comprises ceria in an amount of 5.0 to 50 wt. % based on the total weight of the oxygen storage component. In one embodiment, the oxygen storage component of the first layer comprises ceria in an amount of 20 to 50 wt. % based on the total weight of the oxygen storage component. In one embodiment, the oxygen storage component of the second layer comprises ceria in an amount of 5.0 to 15 wt. % based on the total weight of the oxygen storage component In the context of the present invention, the term zirconia component is a zirconia-based support stabilized or promoted by lanthana or baria or ceria. The examples include lanthana-zirconia, and barium-zirconia.

As used herein, the term "substrate" refers to the monolithic material onto which the catalyst composition is placed, typically in the form of a washcoat containing a plurality of particles containing a catalytic composition thereon.

Reference to "monolithic substrate" or "honeycomb substrate" means a unitary structure that is homogeneous and continuous from inlet to outlet.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. A washcoat is formed by preparing a slurry containing a certain solid content (e.g., 15-60% by weight) of particles in a liquid vehicle, which is then coated onto a substrate and dried to provide a washcoat layer.

As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. In one embodiment, a substrate contains one or more washcoat layers, and each washcoat layer is different in some way (e.g., may differ in physical properties thereof such as, for example particle size or crystallite phase) and/or may differ in the chemical catalytic functions.

The catalytic article may be "fresh" meaning it is new and has not been exposed to any heat or thermal stress for a prolonged period of time. "Fresh" may also mean that the catalyst was recently prepared and has not been exposed to any exhaust gases or elevated temperatures.

Likewise, an "aged" catalyst article is not fresh and has been exposed to exhaust gases and elevated temperatures (i.e., greater than 500° C.) for a prolonged period of time (i.e., greater than 3 hours).

According to one or more embodiments, the substrate of the catalytic article of the presently claimed invention may be constructed of any material typically used for preparing automotive catalysts and typically comprises a ceramic or a metal monolithic honeycomb structure. In one embodiment, the substrate is a ceramic substrate, metal substrate, ceramic foam substrate, polymer foam substrate or a woven fiber substrate.

The substrate typically provides a plurality of wall surfaces upon which washcoats comprising the catalyst compositions described herein above are applied and adhered, thereby acting as a carrier for the catalyst compositions.

Exemplary metallic substrates include heat resistant metals and metal alloys such as titanium and stainless steel as well as other alloys in which iron is a substantial or major component. Such alloys may contain one or more nickel, chromium, and/or aluminium, and the total amount of these metals may advantageously comprise at least 15 wt. %) of the alloy. e.g. 10-25 wt. %) of chromium, 3-8%) of aluminium, and up to 20 wt. %) of nickel. The alloys may also contain small or trace amounts of one or more metals such as manganese, copper, vanadium, titanium and the like. The surface of the metal substrate may be oxidized at high temperature, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-alumina, silicon nitride, zircon mullite, spodumene, alumina-silica magnesia, zircon silicate, sillimanite, magnesium silicates, zircon, petalite, alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which are of any suitable cross-sectional shape, such as trapezoidal, rectangular, square, sinusoidal, hexagonal, oval, circular, and the like. Such structures contain from about 60 to about 1200 or more gas inlet openings (i.e., "cells") per square inch of cross section (cpsi), more usually from about 300 to 900 cpsi. The wall thickness of flow-through substrates can vary, with a typical range being between 0.002 and 0.1 inches. A representative commercially available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry. In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates. However, it will be understood that the invention is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls. In one embodiment, the substrate has a flow through ceramic honeycomb structure, a wall-flow ceramic honeycomb structure, or a metal honeycomb structure.

As used herein, the term "stream" broadly refers to any combination of flowing gas that may contain solid or liquid particulate matter.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

Figure 6A:
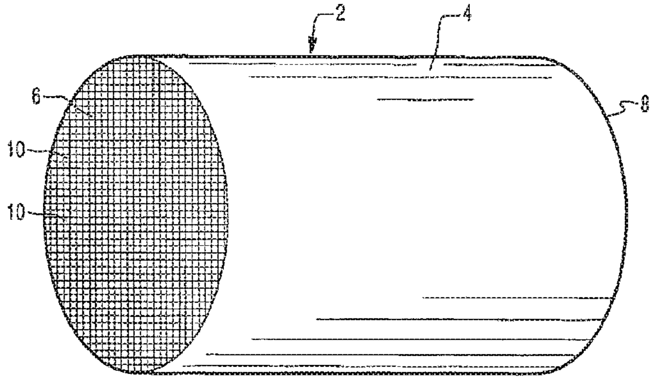
FIG. 6A is a perspective view of a honeycomb-type substrate carrier which may comprise the catalyst composition in accordance with one embodiment of the presently claimed invention.
Figure 6B:
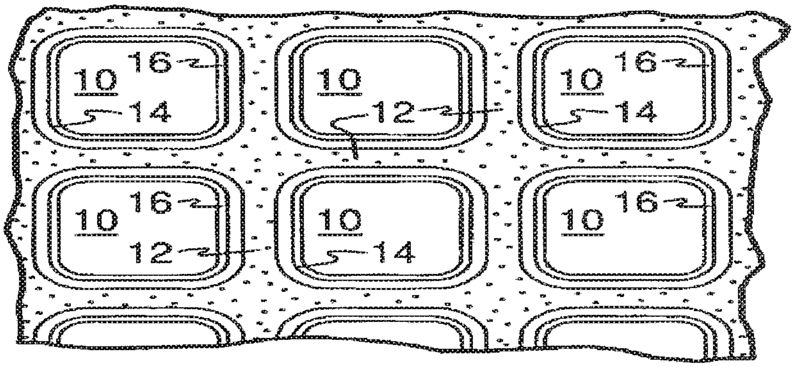
FIG. 6B is a partial cross-section view enlarged relative to FIG. 6A and taken along a plane parallel to the end faces of the substrate carrier of FIG. 6A, which shows an enlarged view of a plurality of the gas flow passages shown in FIG. 6A.

FIGS. 6A and 6B illustrate an exemplary substrate 2 in the form of a flow-through substrate coated with washcoat compositions as described herein. Referring to FIG. 6A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 6B, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As more easily seen in FIG. 6B, walls 12 are so dimensioned and configured that gas flow passages 10 have a substantially regular polygonal shape. As shown, the washcoat compositions can be applied in multiple, distinct layers if desired. In the illustrated embodiment, the washcoats consist of a discrete first washcoat layer 14 adhered to the walls 12 of the substrate member and a second discrete washcoat layer 16 coated over the first washcoat layer 14. In one embodiment, the presently claimed invention is also practiced with two or more (e.g., 3, or 4) washcoat layers and is not limited to the illustrated two-layer embodiment.

Figure 7:
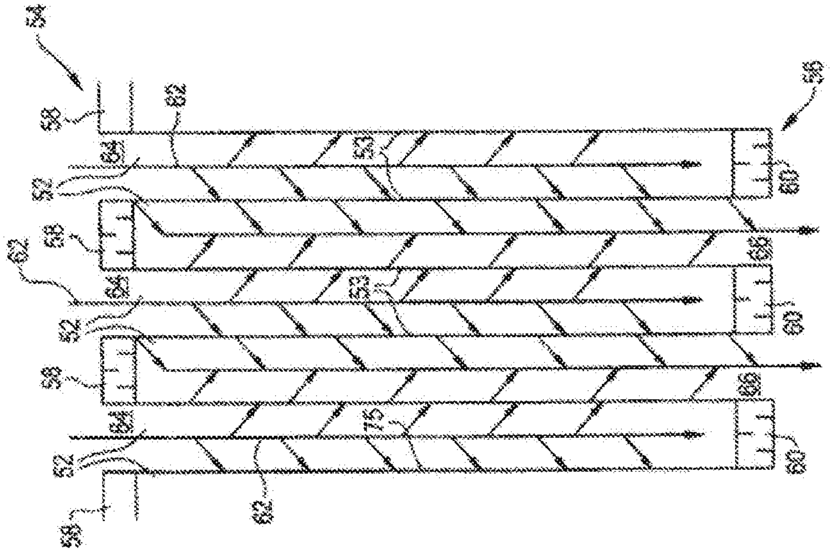
FIG. 7 is a cutaway view of a section enlarged relative to FIG. 6A, wherein the honeycomb-type substrate in FIG. 6A represents a wall flow filter substrate monolith.

FIG. 7 illustrates an exemplary substrate 2 in the form of a wall flow filter substrate coated with a washcoat composition as described herein. As seen in FIG. 7, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalysed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

In accordance with still another aspect, the presently claimed invention provides a process for preparing the catalytic article. In one embodiment, the process comprises preparing a first layer slurry; depositing the first layer slurry on a substrate to obtain a first layer; preparing a second layer slurry; and depositing the second layer slurry on the first layer to obtain a second layer followed by calcination at a temperature ranging from 400 to 700° C., wherein the step of preparing the first layer slurry or second layer slurry comprises a technique selected from incipient wetness impregnation, incipient wetness co-impregnation, and post-addition. In one embodiment, the process involves a pre-step of thermal or chemical fixing of platinum or palladium or both on supports.

The thermal fixing involves deposition of the PGM onto a support, e.g. via incipient wetness impregnation method, followed by the thermal calcination of the resulting PGM/support mixture. As an example, the mixture is calcined for 1-3 hours at 400-700° C. with a ramp rate of 1-25° C./min.

The chemical fixing involves deposition of the PGM onto a support followed by a fixation using an additional reagent to chemically transform the PGM. As an example, aqueous Pd-nitrate is impregnated onto alumina. The impregnated powder is not dried or calcined, instead, it is added to an aqueous solution of Ba-hydroxide. As a result of the addition, the acidic Pd-nitrate reacts with the basic Ba-hydroxide yielding the water-insoluble Pd-hydroxide and Ba-nitrate. Thus, Pd is chemically fixed as an insoluble component in the pores and on the surface of the alumina support. Alternatively, the support can be impregnated with the acidic component first followed by the second, basic, component. The chemical reaction between the two reagents deposited onto the support, e.g. alumina, lead to the formation of insoluble or little soluble compounds that are also deposited in the support pores and on the surface.

Incipient wetness impregnation techniques, also called capillary impregnation or dry impregnation are commonly used for the synthesis of heterogeneous materials, i.e., catalysts. Typically, an active metal precursor is dissolved in an aqueous or organic solution and then the metal-containing solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower. The catalyst is dried and calcined to remove the volatile components within the solution, depositing the metal on the surface of the catalyst support. The concentration profile of the impregnated material depends on the mass transfer conditions within the pores during impregnation and drying. Multiple active metal precursors, after appropriate dilution, can be co-impregnated onto a catalyst support. Alternatively, an active metal precursor is introduced to a slurry via post-addition under agitation during the process of a slurry preparation.

The support particles are typically dry enough to absorb substantially all of the solution to form a moist solid. Aqueous solutions of water-soluble compounds or complexes of the active metal are typically utilized, such as rhodium chloride, rhodium nitrate, rhodium acetate, or combinations thereof where rhodium is the active metal and palladium nitrate, palladium tetra amine, palladium acetate, or combinations thereof where palladium is the active metal. Following treatment of the support particles with the active metal solution, the particles are dried, such as by heat treating the particles at elevated temperature (e.g., 100-150° C.) for a period of time (e.g., 1-3 hours), and then calcined to convert the active metal to a more catalytically active form. An exemplary calcination process involves heat treatment in air at a temperature of about 400-550° C. for 10 min to 3 hours. The above process can be repeated as needed to reach the desired level of loading of the active metal by means of impregnation.

The above-noted catalyst compositions are typically prepared in the form of catalyst particles as noted above. These catalyst particles are mixed with water to form a slurry for purposes of coating a catalyst substrate, such as a honeycomb-type substrate. In addition to the catalyst particles, the slurry may optionally contain a binder in the form of alumina, silica, zirconium acetate, zirconia, or zirconium hydroxide, associative thickeners, and/or surfactants (including anionic, cationic, non-ionic or amphoteric surfactants). Other exemplary binders include boehmite, gamma-alumina, or delta/theta alumina, as well as silica sol. When present, the binder is typically used in an amount of about 1-5 wt. % of the total washcoat loading. Addition of acidic or basic species to the slurry is carried out to adjust the pH accordingly. For example, in some embodiments, the pH of the slurry is adjusted by the addition of ammonium hydroxide, aqueous nitric acid, or acetic acid. A typical pH range for the slurry is about 3 to 12.

The slurry can be milled to reduce the particle size and enhance particle mixing. The milling is accomplished in a ball mill, continuous mill, or other similar equipment, and the solids content of the slurry may be, e.g., about 20-60 wt. %, more particularly about 20-40 wt. %. In one embodiment, the post-milling slurry is characterized by a $D_{90}$ particle size of about 3 to about 40 microns, preferably 10 to about 30 microns, more preferably about 10 to about 15 microns. The $D_{90}$ is determined using a dedicated particle size analyzer. The equipment employed in this example uses laser diffraction to measure particle sizes in small volume slurry. The $D_{90}$, typically with units of microns, means 90% of the particles by number have a diameter less than that value.

The slurry is coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period (e.g., 10 min-3 hours) and then calcined by heating, e.g., at 400-700° C., typically for about 10 minutes to about 3 hours. Following drying and calcining, the final washcoat coating layer is viewed as essentially solvent-free. After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

In certain embodiments, the coated substrate is aged, by subjecting the coated substrate to heat treatment. In one embodiment, aging is done at a temperature of about 850° C. to about 1050° C. in an environment of 10 vol. % water in an alternating hydrocarbon/air feed for 50-75 hours. Aged catalyst articles are thus provided in certain embodiments. In certain embodiments, particularly effective materials comprise metal oxide-based supports (including, but not limited to substantially 100% ceria supports) that maintain a high percentage (e.g., about 95-100%) of their pore volumes upon aging (e.g., at about 850° C. to about 1050° C., 10 vol. % water in an alternating hydrocarbon/air feed, 50-75 hours aging).

In another aspect, the presently claimed invention provides an exhaust system for internal combustion engines. The exhaust system comprises a catalytic article as described herein above. In one embodiment, the exhaust system comprises a platinum group metal based three-way conversion (TWC) catalytic article and a layered catalytic article according to present invention, wherein the platinum group metal based three-way conversion (TWC) catalytic article is positioned downstream from an internal combustion engine and the layered catalytic article is positioned downstream in fluid communication with the platinum group metal based three-way conversion (TWC) catalytic article.

In another embodiment, the exhaust system comprises a platinum group metal based three-way conversion (TWC) catalytic article and a layered catalytic article according to the present invention, wherein the layered catalytic article is positioned downstream from an internal combustion engine and the platinum group metal based three-way conversion (TWC) catalytic article is positioned downstream in fluid communication with the three-way conversion (TWC) catalytic article. The exhaust systems are shown in FIGS. 2B and 2C.

In one illustrative embodiment, the exhaust system comprises a) a layered catalytic article comprising i) a first layer comprising Pd supported on OSC, Pd supported on an alumina, and barium oxide, and ii) a second layer comprising Rh and Pt supported on OSC, and Pd supported on alumina; and b) a TWC catalyst comprising i) a first layer comprising Pd supported on OSC and alumina, and barium oxide, and ii) a second layer comprising Rh supported on alumina and OSC. The exhaust system is illustrated in FIG. 2B, wherein CC1 catalyst IC-1 (invention catalytic article) is positioned in fluid communication with an internal combustion engine and CC2 catalyst RC-2 (reference CC catalyst) is positioned in fluid communication with CC1 catalyst.

Figure 2A:
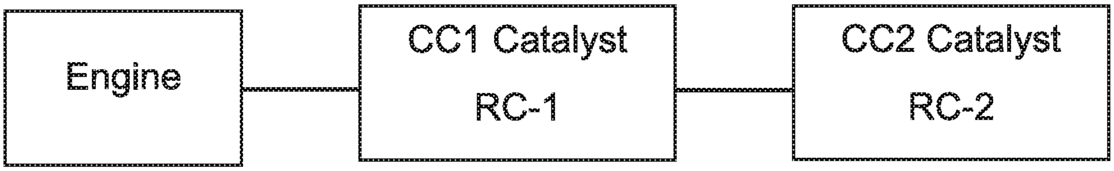
FIG. 2 is a schematic representation of exhaust systems in accordance with some embodiments of the presently claimed invention.
Figure 2B:
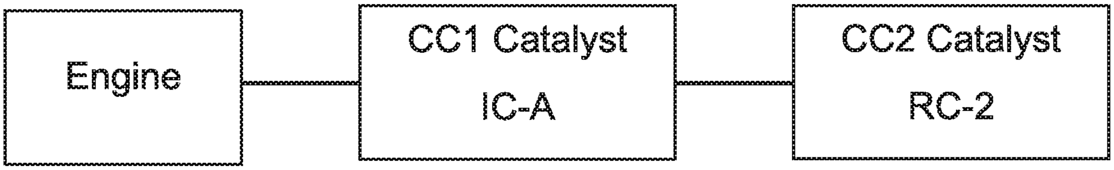
Figure 2C:
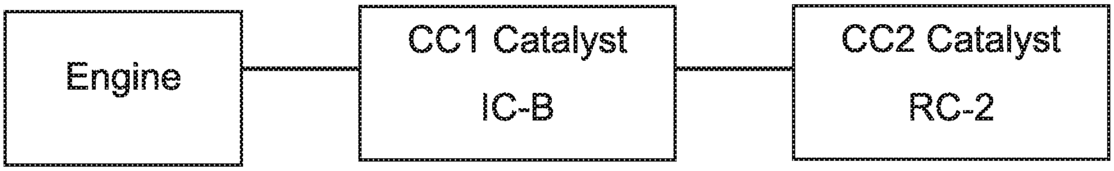

FIG. 2A illustrates a reference exhaust system in which CC1 RC-1 catalyst comprises i) a first layer comprising Pd supported on OSC and alumina, and barium oxide, and ii) a second layer comprising Rh supported on alumina and Pd supported on OSC; and CC2-RC-2 catalyst comprises i) a first layer comprising Pd supported on OSC and alumina, and barium oxide, and ii) a second layer comprising Rh supported on alumina and Pd supported on OSC.

In another illustrative embodiment, the exhaust system comprises a) a layered catalytic article comprising i) a first layer comprising Pd supported on OSC, Pd supported on an alumina, and barium oxide, and ii) a second layer comprising Rh supported on OSC, and Pt supported on lanthana-zirconia; and b) a TWC catalyst comprising i) a first layer comprising Pd supported on OSC and alumina, and barium oxide, and ii) a second layer comprising Rh supported on alumina and OSC. The exhaust system is illustrated in FIG. 2C, wherein CC1 catalyst IC-2 (invention catalytic article) is positioned in fluid communication with an internal combustion engine and CC2 catalyst RC-2 (reference CC catalyst) is positioned in fluid communication with CC1 catalyst.

In one aspect, the presently claimed invention also provides a method of treating a gaseous exhaust stream which comprises hydrocarbons, carbon monoxide, and nitrogen oxide. The method involves contacting the exhaust stream with a catalytic article or an exhaust system according to the presently claimed invention. The terms "exhaust stream", "engine exhaust stream", "exhaust gas stream", and the like refer to any combination of flowing engine effluent gas that may also contain solid or liquid particulate matter. The stream comprises gaseous components and is, for example, exhaust of a lean burn engine, which may contain certain non-gaseous components such as liquid droplets, solid particulates and the like. An exhaust stream of a lean burn engine typically comprises combustion products, products of incomplete combustion, oxides of nitrogen, combustible and/or carbonaceous particulate matter (soot) and un-reacted oxygen and/or nitrogen. Such terms refer as well as to the effluent downstream of one or more other catalyst system components as described herein. In one embodiment, there is provided a method of treating exhaust stream containing carbon monoxide.

In another aspect, the presently claimed invention also provides a method of reducing hydrocarbons, carbon monoxide, and nitrogen oxide levels in a gaseous exhaust stream. The method involves contacting the gaseous exhaust stream with a catalytic article or an exhaust system according to the presently claimed invention to reduce the levels of hydrocarbons, carbon monoxide, and nitrogen oxide in the exhaust gas.

In still another aspect, the presently claimed invention also provides use of the catalytic article of the presently claimed invention for purifying a gaseous exhaust stream comprising hydrocarbons, carbon monoxide, and nitrogen oxide.

In some embodiments, the catalytic article converts at least about 60%, or at least about 70%, or at least about 75%, or at least about 80%, or at least about 90%, or at least about 95% of the amount of carbon monoxide, hydrocarbons and nitrous oxides present in the exhaust gas stream prior to contact with the catalytic article. In some embodiment, the catalytic article converts hydrocarbons to carbon dioxide and water. In some embodiments, the catalytic article converts at least about 60%, or at least about 70%, or at least about 75%, or at least about 80%, or at least about 90%, or at least about 95% of the amount of hydrocarbons present in the exhaust gas stream prior to contact with the catalytic article. In some embodiment, the catalytic article converts carbon monoxide to carbon dioxide. In some embodiment, the catalytic article converts nitrogen oxides to nitrogen.

In some embodiments, the catalytic article converts at least about 60%, or at least about 70%, or at least about 75%, or at least about 80%, or at least about 90%, or at least about 95% of the amount of nitrogen oxides present in the exhaust gas stream prior to contact with the catalytic article. In some embodiment, the catalytic article converts at least about 50%, or at least about 60%, or at least about 70%, or at least about 80%, or at least about 90%, or at least about 95% of the total amount of hydrocarbons, carbon dioxide, and nitrogen oxides combined present in the exhaust gas stream prior to contact with the catalytic article.

EXAMPLES

Aspects of the presently claimed invention are more fully illustrated by the following examples, which are set forth to illustrate certain aspects of the present invention and are not to be construed as limiting thereof.

Example 1: Preparation of a Reference Catalytic Article (CC1 RC-1, Bimetallic Catalyst: Pd:Rh (1:0.052))

A Pd/Rh-based TWC catalytic article was prepared as a close-coupled catalyst. The total PGM loading (Pd/Pt/Rh) is 76/0/4. The bottom coat contains 68.4 g/ft$^3$ of Pd, or 90% of the total Pd in the catalyst. The top coat contains 7.6 g/ft$^3$ of Pd and 4 g/ft$^3$ of Rh, or 10% total Pd and 100% total Rh in the catalyst. The bottom coat has a washcoat loading of 2.34 g/inch$^3$ and the top coat has a washcoat loading of 1.355 g/inch$^3$. The bottom coat was prepared by impregnating 60% of Pd-nitrate solution (43.3 grams, 28% aqueous Pd-nitrate solution) on 314 grams of alumina and 40% of Pd-nitrate solution (28.9 grams, 28% aqueous Pd-nitrate solution) on 785 grams of ceria-zirconia. The alumina portion was fixed chemically by adding the Pd/alumina mixture to an aqueous solution of 85.6 grams barium acetate in water. 39 grams barium-sulfate was also added to the mixture. This component was then milled to a $D_{90}$ of below 16 μm. The pH was controlled around 4-5 by addition of nitric acid, if necessary. The ceria-zirconia portion was added to water and milled to $D_{90}$ of below 16 μm. The pH was controlled around 4-5 by addition of nitric acid, if necessary. The two components were then blended, and 128 grams alumina-binder was added to the blend.

The top coat has two components. A first component was prepared by impregnating a mixture of 20.7 grams of Rh-nitrate (9.9% Rh-content) and 80.5 grams of neodymium nitrate (27.5% $Nd_2O_3$ content) in 560 grams of water on 903 grams of alumina. This step was followed by calcination at 500° C. for 2 hours to allow PGM fixation on the support. The resulting powder was then mixed with water and was milled to a $D_{90}$ of below 16 μm. The pH was controlled around 4-5 by addition of nitric acid, if necessary. The second component was prepared by impregnating 13.8 grams of Pd-nitrate (28% Pd content) mixed with water on 260.4 grams of ceria-zirconia followed by calcination at 500° C. for 2 hours to allow PGM fixation on the support. The resulting powder was then mixed with water and was milled to a $D_{90}$ of below 16 μm. The pH was controlled around 4-5 by addition of nitric acid, if necessary. The two thus obtained slurries were blended, and 156 grams of alumina-binder was added. The pH is controlled around 4-5 by addition of nitric acid, if necessary. The catalytic article was prepared by first coating the bottom coat slurry onto a 600/3.5 ceramic substrate. The obtained coated substrate was then dried and calcined for 2 hours at 500° C. Then, the second (top coat) slurry was applied. The resulting product was again calcined for 2 hours at 500° C.

Example 2: Preparation of an Invention Catalytic Article (CC 1 IC-A, Trimetallic-Pd, Pt and Rh in Top Layer and Pd in Bottom Layer (Ratio: 1.0:1.0:0.105), Thermal Fixing)

A catalytic article was formulated using Pd, Pt and Rh to yield a 38/38/4 Design. The total PGM loading is 80 g/ft$^3$ and the bottom coat contains 30.4 g/ft$^3$ of Pd, or 80% of the total Pd in the catalyst. The top coat contains 7.6 g/ft$^3$ of Pd, 38 g/ft$^3$ of Pt and 4 g/ft$^3$ of Rh, or 20% of total Pd and 100% of total Pt and Rh in the catalyst. The bottom coat has a washcoat loading of 2.318 g/inch$^3$ and the top coat has a washcoat loading of 1.352 g/inch$^3$. The bottom coat was prepared by impregnating 60% of Pd-nitrate solution (24.3 grams, 28% aqueous Pd-nitrate solution) on 396 grams of alumina and 40% of Pd-nitrate solution (16.2 grams, 28% aqueous Pd-nitrate solution) on 990.6 grams of ceria-zirconia. The alumina portion was fixed chemically by adding the Pd/alumina mixture to an aqueous solution of 108 grams barium acetate in water. 49.3 grams barium-sulfate was also added to the mixture. This component was then milled to a $D_{90}$ of below 16 μm. The pH was controlled around 4-5 by addition of nitric acid, if necessary. The ceria-zirconia portion was added to water and milled to $D_{90}$ of below 16 μm. The pH was controlled around 4-5 by addition of nitric acid, if necessary. The two components were then blended, and 161 grams of alumina-binder was added.

The top coat has two components. A first component was prepared by impregnating a mixture of 17.3 grams of Pd-nitrate (28% Pd-content) in 200 grams of water on 283 grams of alumina. This step was followed by calcination at 500° C. for 2 hours to allow PGM fixation on the support. The resulting powder was then mixed with water and was milled to a $D_{90}$ of below 16 μm. The pH was controlled around 4-5 by addition of nitric acid, if necessary. The second component was prepared by impregnating 170.9 grams of Pt-nitrate (14.3% Pt content) and 25.9 grams of Rh-nitrate (9.9% Rh content) mixed with water on 1175.4 grams of ceria-zirconia followed by calcination at 500° C. for 2 hours to allow PGM fixation on the support. The resulting powder was then mixed with water and was milled to a $D_{90}$ of below 16 μm. The pH was controlled around 4-5 by addition of nitric acid, if necessary. The two thus obtained slurries were blended, and 194 grams of alumina-binder was added. The pH was controlled around 4-5 by addition of nitric acid, if necessary. The catalytic article was prepared by first coating the bottom coat slurry onto 600/3.5 ceramic substrates. The obtained coated substrate is then dried and calcined for 2 hours at 500° C. Then, the second, top coat, slurry is applied. The resulting product is again calcined for 2 hours at 500° C. The comparative testing showed that the invention catalytic article shows improved reduction of THC, NO and CO compared to reference catalytic article RC-1. The results are shown in accompanying Figures.

Example 3: Preparation of an Invention Catalytic Article (CC 1 IC-B, Trimetallic-Pt and Pd in Separate Layers (Top Layer: Rh+Pt, Bottom Layer: Pd, Ratio: 1.0:1.0:0.105)

A catalytic article was formulated using Pd, Pt and Rh to yield a 38/38/4 design. The total PGM loading is 80 g/ft$^3$ and the bottom coat contains 38 g/ft$^3$ of Pd, or 100% of total Pd in the catalyst. The top coat contains 38 g/ft$^3$ of Pt and 4 g/ft$^3$ of Rh, or 100% of the total Pt and Rh in the catalyst. The bottom coat has a washcoat loading of 2.322 g/inch$^3$ and the top coat a washcoat loading of 1.347 g/inch$^3$. The bottom coat was prepared by impregnating 60% of Pd-nitrate solution (30.3 grams, 28% aqueous Pd-nitrate solution) on 395.5 grams of alumina and 40% of Pd-nitrate solution (20.2 grams, 28% aqueous Pd-nitrate solution) on 988.8 grams of ceria-zirconia. The alumina portion was fixed chemically by adding the Pd/alumina mixture to an aqueous solution of 108 grams of barium acetate in water. 49.2 grams of barium-sulfate was also added to the mixture. This component was then milled to a $D_{90}$ of below 16 μm. The pH was controlled around 4-5 by addition of nitric acid, if necessary. The ceria-zirconia portion was added to water and milled to $D_{90}$ of below 16 μm. The pH was controlled around 4-5 by addition of nitric acid, if necessary. The two components were then blended, and 161.5 grams of alumina-binder was added.

Figure 1B:
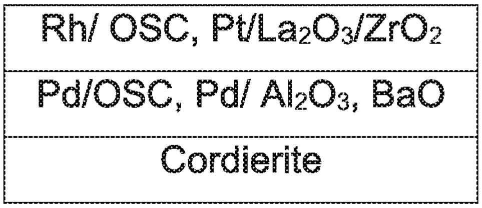
Figure 1C:
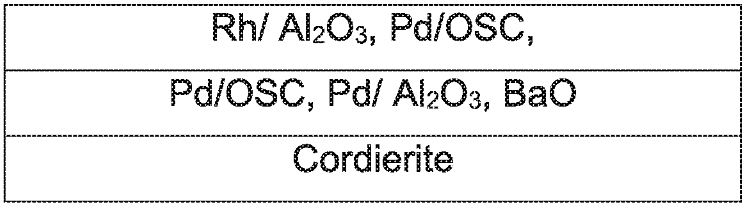

The top coat has two components. A first component was prepared by impregnating a mixture of 26 grams of Rh-nitrate (9.9% Rh-content) in 320 grams of water on 731.6 grams of ceria-zirconia. This step was followed by calcination at 500° C. for 2 hours to allow PGM fixation on the support. The second component was prepared by impregnating 171.4 grams of Pt-nitrate (14.3% Pt content) mixed with water on 731.6 grams of lanthana-zirconia followed by calcination at 500° C. for 2 hours to allow PGM fixation on the support. The two component powders were then mixed with water and milled to a $D_{90}$ of below 16 μm. The thus obtained slurry was mixed with 194.8 grams of alumina-binder. The pH was controlled around 4-5 by addition of nitric acid, if necessary. The catalytic article was prepared by first coating the bottom coat slurry onto a 600/3.5 ceramic substrate. The obtained coated substrate was then dried and calcined for 2 hours at 500° C. Then, the second (top coat) slurry was applied. The resulting product was again calcined for 2 hours at 500° C. The, invention catalytic articles A and B are illustrated in FIGS. 1A and 1B, whereas the reference catalytic article is illustrated in FIG. 1C of the accompanying drawings. The comparative testing showed that the invention catalytic article shows improved reduction of THC, NO and CO compared to reference catalytic article RC-1. The results are shown in accompanying Figures.

Example 4: Preparation of Catalytic Articles (Catalytic Article C; Catalytic Article D and Catalytic Article E, Pd/Pt in the Bottom Layer with Variation in Support, Out of Scope)

Catalytic articles C, D & E were prepared to check its efficacy when Pd was directly substituted with Pt in the reference CC TWC design. The substitution was performed by replacing 50% of Pd with 50% Pt on a weight basis. The catalyst designs are provided in the following table:

TABLE NO. 1

| Catalytic article designs | | | |
|---|---|---|---|
| | Catalytic article C | Catalytic article D | Catalytic article E |
| Top coat (Similar) | Rh on Ce—Zr and Pt on Al | Rh on Ce—Zr and Pt on Al | Rh on Ce—Zr and Pt on Al |
| Bottom coat (Varied) | Pd/Pt on Al/ Ce—Zr | Pd on Ce—Zr and Pt on Al | Pd on Al and Pt on Ce—Zr |

The bottom coat of catalytic article C was prepared by using a Pd/Pt mixture that was split identically between alumina and ceria zirconia, whereas the top coat was kept identical to top coat of reference catalyst, i.e. the top coat contained Pd on ceria-zirconia and Rh on alumina. The bottom coat of catalytic article D was prepared using Pd on ceria-zirconia and Pt on alumina, whereas the top coat was prepared using Rh on ceria-zirconia and Pt on alumina. The bottom coat of catalytic article E was prepared using Pd on alumina and Pt on ceria-zirconia, whereas the top coat was prepared using Rh on ceria-zirconia and Pt on alumina. The washcoat loadings were kept same as in the reference.

The catalysts were prepared by first coating the bottom coat slurry onto a 600/3.5 ceramic substrate. The obtained coated substrate was then dried and calcined for 2 hours at 500° C. Then, the second (top coat) slurry was applied. The resulting product was again calcined for 2 hours at 500° C. The comparative testing showed that the catalytic article C, D and E show lower reduction of THC, NO and CO compared to reference catalytic article RC-1. The results are shown in accompanying Figures.

Example 5: Preparation of a Second Close-Coupled TWC Reference Catalytic Article (CC2 RC-2 Catalytic Article)

The reference CC2 TWC catalytic article (Pd/Pt/Rh: 14/0/4) was prepared and used in the second close-coupled position in all the following examples. The bottom coat was prepared by mixing 718.5 grams of alumina with water, controlling the pH around 4-5 by addition of nitric acid, followed by milling to a $D_{90}$ of below 16 μm. 716.2 grams of ceria-zirconia was then added to the slurry. Then, 27.7 grams of Pd (27.3% Pd content) was added to the slurry and after a brief mixing, the slurry was milled again to a $D_{90}$ of below 14 μm. In the next step, 71.5 grams of barium sulfate and 239.2 grams of alumina-binder were added, and the final slurry was mixed for 20 minutes.

The top coat is made of two components. A first component was prepared by impregnating 11.3 grams of Rh-nitrate (9.8% Rh-content) in 367 grams of water on 483 grams of alumina. The powder was then added to water and methyl-ethyl-amine (MEA) was added until pH is equal 8. The slurry was then mixed 20 minutes and the pH was reduced to 5.5-6 using nitric acid. The slurry was then milled to a $D_{90}$ of below 14 μm. A second component was made by impregnating 11.3 grams of Rh-nitrate (9.8% Rh content) mixed with 550 grams of water on 979.3 grams of ceria-zirconia. The powder was then added to water and methyl-ethyl-amine (MEA) was added until pH was equal 8. The slurry was then mixed for 20 minutes. To this 80.6 grams of zirconium nitrate (19.7% $ZrO_2$ content) was added and the pH was reduced to 5.5-6 using nitric acid, if necessary. The slurry was then milled to a $D_{90}$ of below 14 μm. The two obtained slurries were then blended, and 245 grams of alumina-binder was added, and the pH was controlled around 4-5 by addition of nitric acid, if necessary.

The catalytic article was prepared by first coating the bottom coat slurry onto a 600/3.5 ceramic substrate. The obtained coated substrate was then dried and calcined for 2 hours at 500° C. Then, the second (top coat) slurry was applied. The resulting product was again calcined for 2 hours at 500° C.

Example 6: Preparation of an Invention Catalyst System A and its Testing (CC1 IC-A+CC2 RC-2)

Figure 4A:
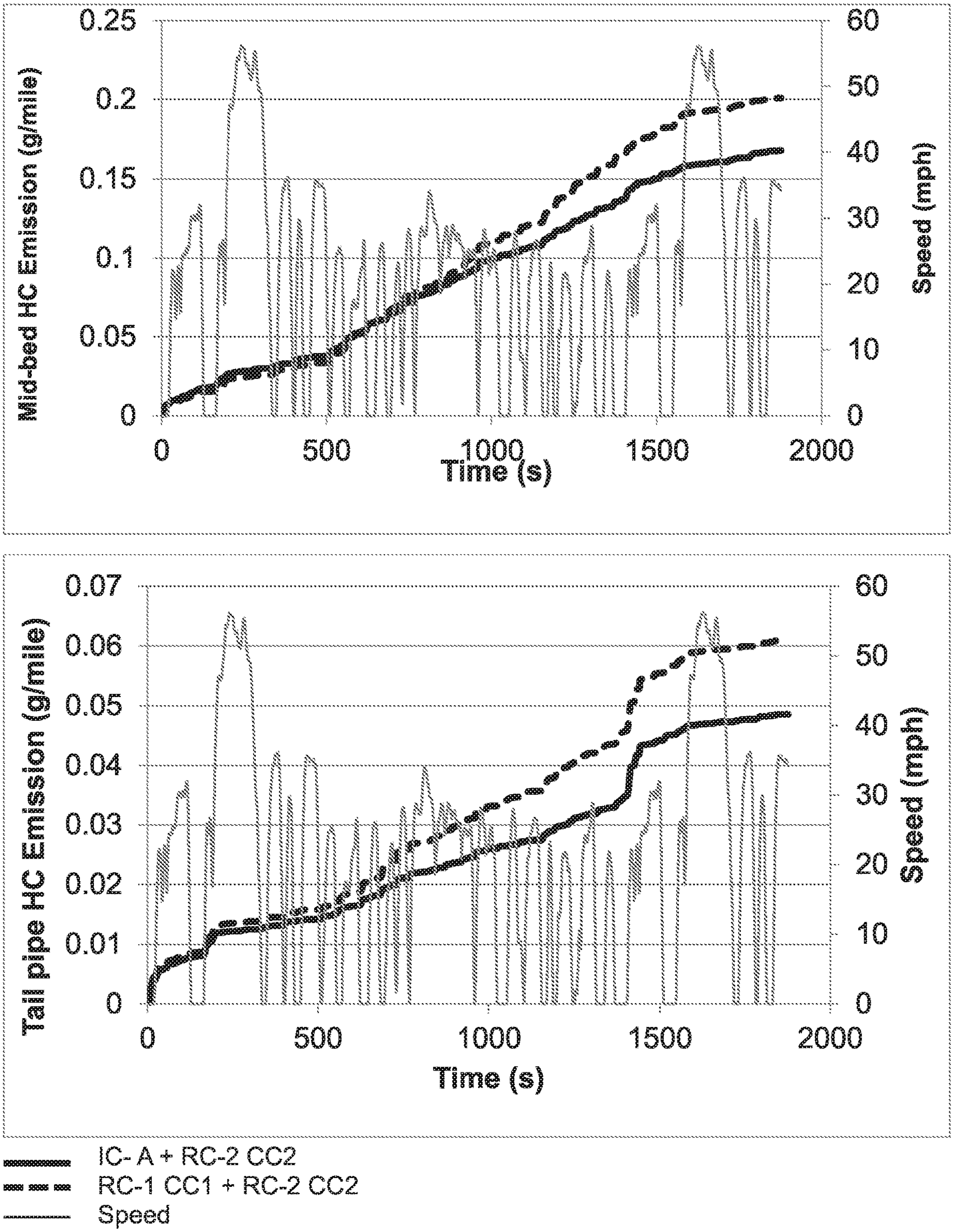
FIG. 4A illustrate line graphs showing comparative test results for cumulative HC emission in mid-bed and tail-pipe of an invention catalyst A and a reference catalyst.
Figure 4B:
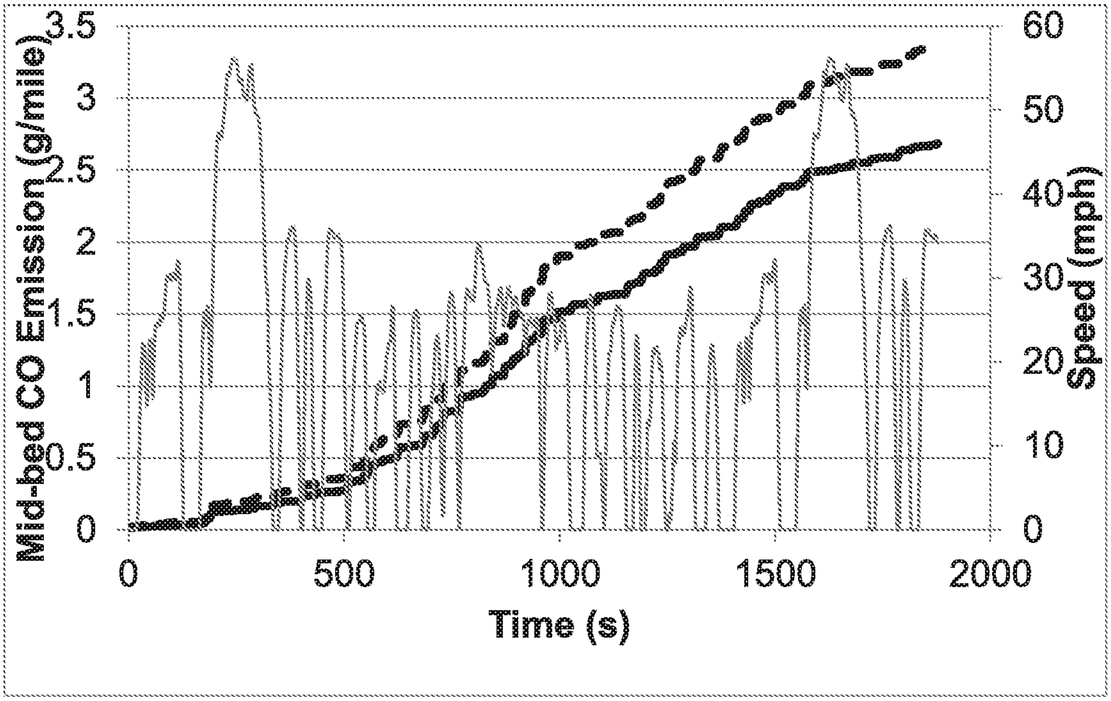
FIG. 4B illustrate line graphs showing comparative test results for cumulative CO emission in mid-bed and tail-pipe of an invention catalyst A and a reference catalyst.
Figure 4B:
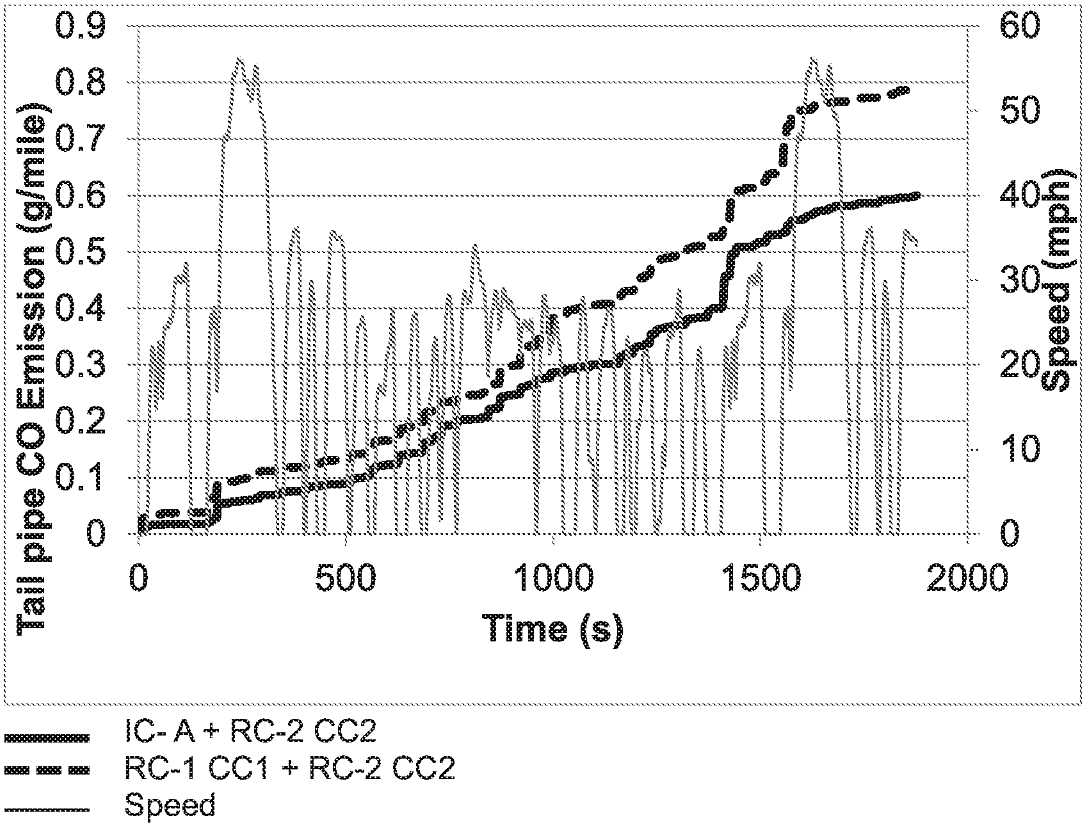
Figure 4C:
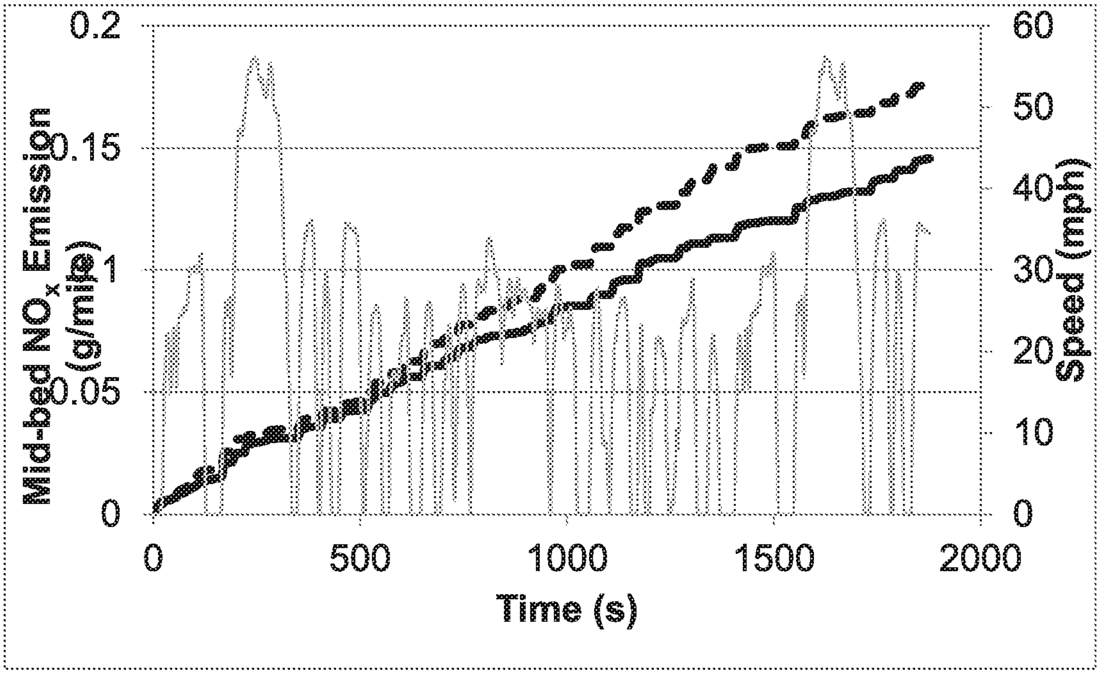
FIG. 4C illustrate line graphs showing comparative test results for cumulative NO emission in mid-bed and tail-pipe of an invention catalyst A and a reference catalyst.
Figure 4C:
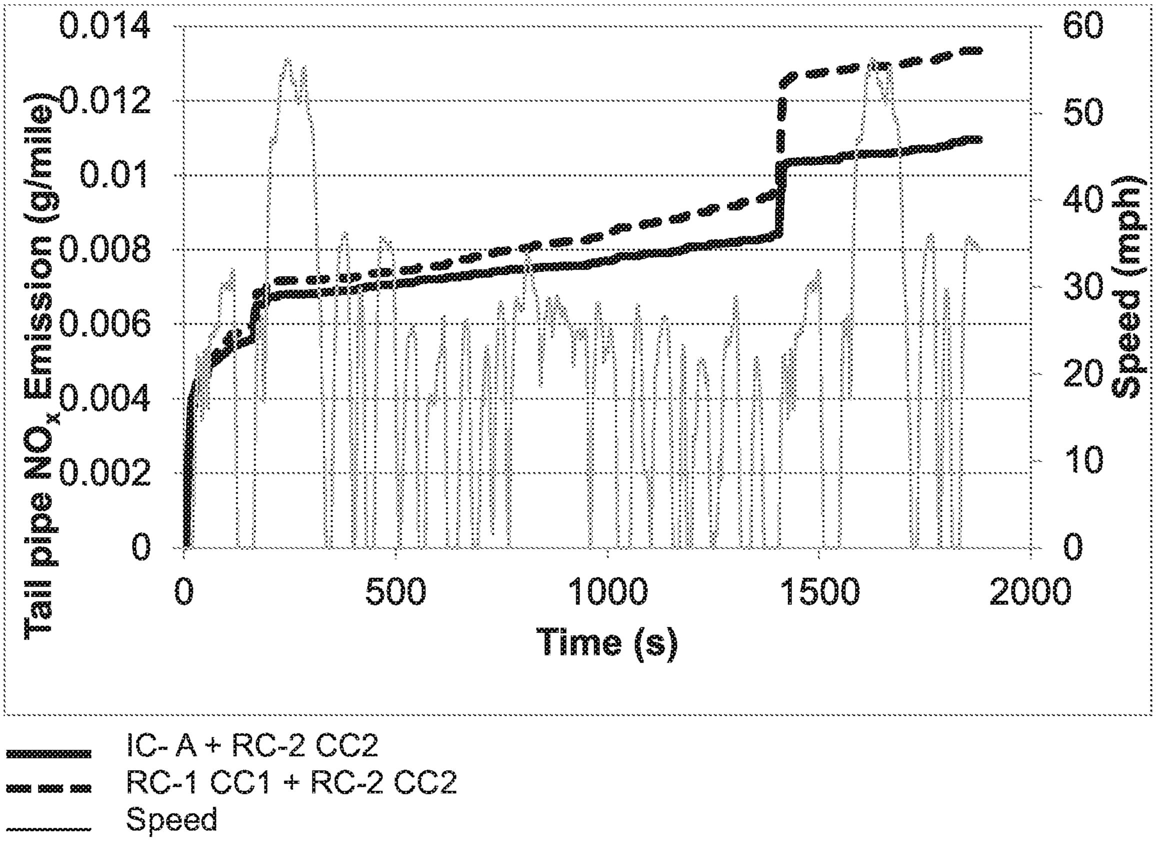

A catalyst system A comprised of an invention catalytic article A (Pd/Pt/Rh:38/38/4) and a reference CC2 catalytic article (Pd/Pt/Rh:14/0/4) was prepared and compared to a reference system comprised of a reference CC1 catalytic article (Pd/Pt/Rh:76/0/4) and a reference CC2 catalytic article (Pd/Pt/Rh:14/0/4). The catalyst system A is shown in FIG. 2B, whereas the reference system is shown in FIG. 2A. Both the systems were engine aged for 50 hrs at 950° C. under alternating feed conditions and subsequently tested using the FTP-75 testing protocol on a SULEV-30 certified light-duty vehicle. The claimed catalyst system A demonstrates improved TWC performance with a 17% THC, 20% CO and 17% $NO_x$ improvement in the mid-bed as well as with a 20% THC, 24% CO and 18% $NO_x$ improvement in the tail-pipe compared to the reference system. Hence, the 38/38/4 tri-metal catalyst not only meets the performance of the Pd/Rh 0/76/4 reference, but also provides an improvement over the reference. The results are shown in FIGS. 4A, 4B and 4C.

Example 7: Preparation of an Invention Catalyst System B and its Testing: (CC1 IC–B+CC2 RC-2)

Figure 3:
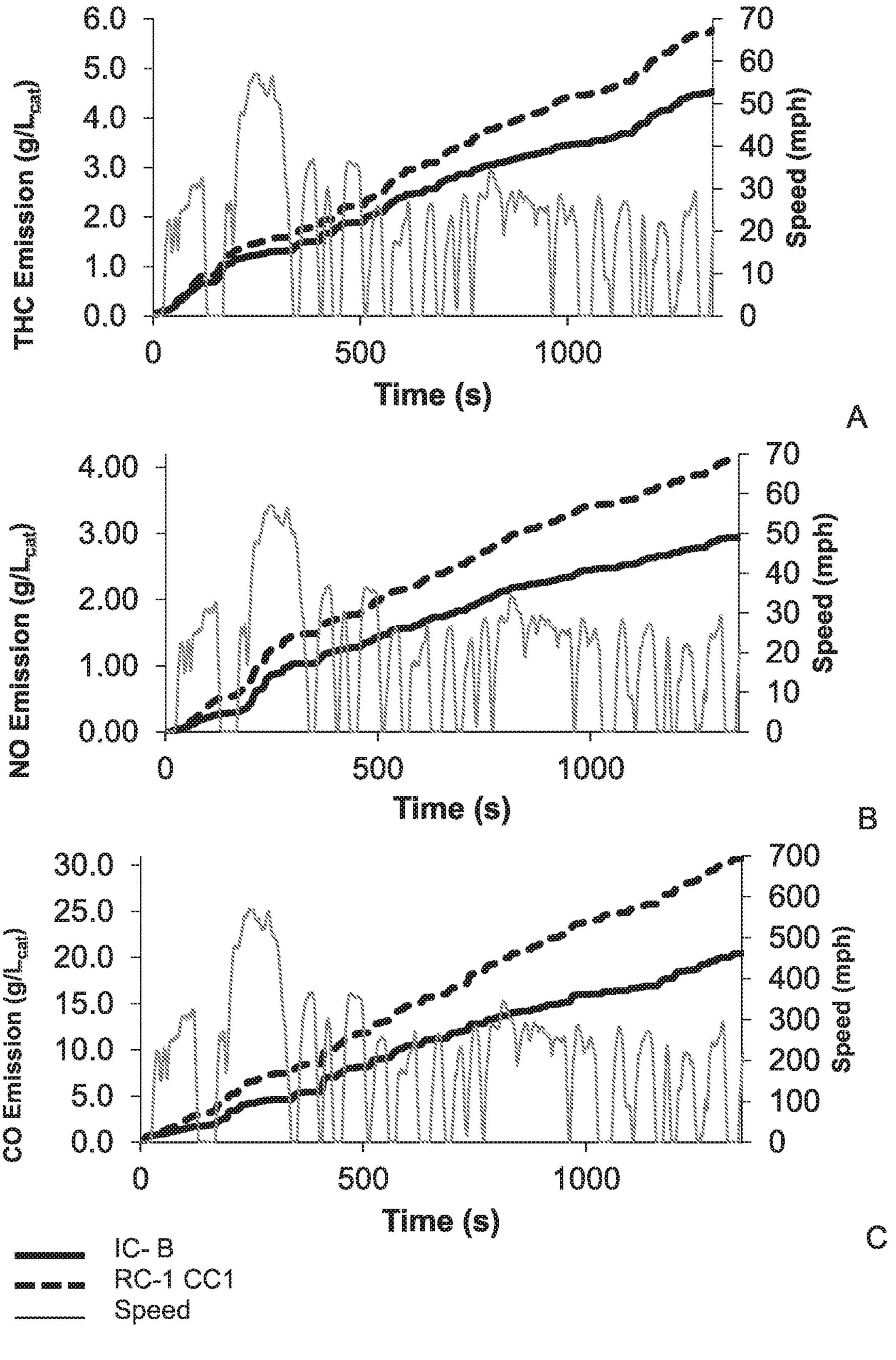
FIGS. 3A, 3B and 3C are line graphs showing comparative test results for cumulative THC emission, NO emission, and CO emission of an invention catalyst B and a reference catalyst.

A system comprised of an invention catalytic article B (Pd/Pt/Rh:38/38/4) and a reference CC2 catalytic article (Pd/Pt/Rh:14/0/4) was prepared and compared to a reference system comprised of the reference CC1 catalytic article (Pd/Pt/Rh:76/0/4) and CC2 catalytic article (Pd/Pt/Rh:14/0/4). The catalyst system B is shown in FIG. 2C. Both the systems were reactor aged for 12 hrs. at 980° C. under alternating feed conditions and subsequently tested using a reactor simulating a SULEV-30 certified light-duty vehicle. The reactor is setup such that the lambda, temperature and speed trace match those of the vehicle under FTP-72 testing conditions. The claimed system B demonstrates improved TWC performance with a 21% THC, 33% CO and 28% NO improvement representing the mid-bed results. The results are shown in FIG. 3.

The catalyst system designs are provided in the following table.

TABLE 2

| Catalyst system designs | | |
|---|---|---|
| | CC1 | CC2 |
| Example 6 (Catalyst System A) | Example 2 (CC1, IC-A) | Example 5 (RC-2) |
| Example 7 (Catalyst System B) | Example 3 (CC1, IC-B) | Example 5 (RC-2) |
| Example 8 Reference System | Example 1 (CC1, RC-1) | Example 5 (RC-2) |

Findings/Results

Figure 5:
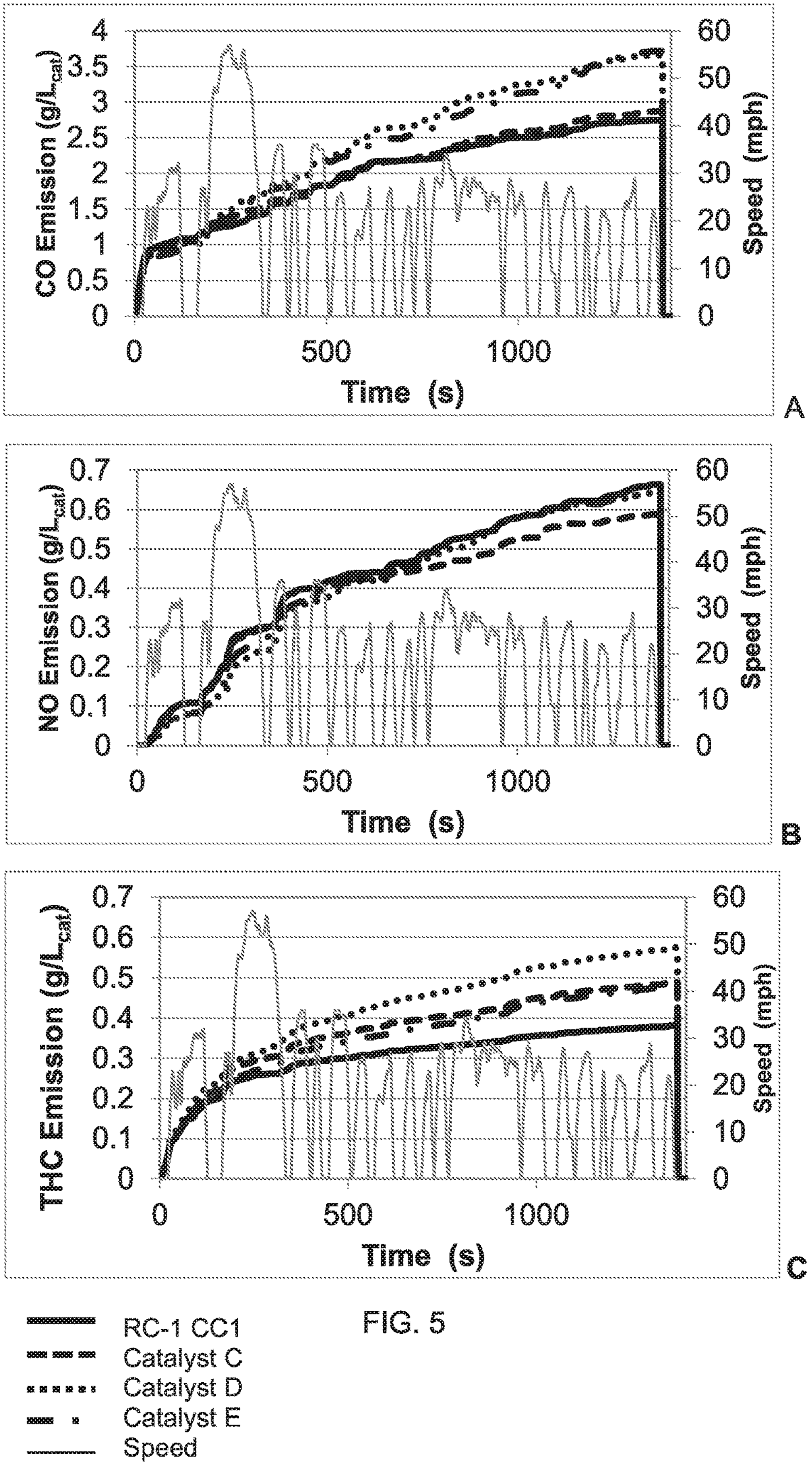
FIGS. 5A, 5B and 5C are line graphs showing comparative test results for cumulative CO emission, NO emission, and THC emission of catalysts C, D & E and a reference catalyst.

From the above examples and the results shown in the figures, it is found that a direct incorporation of platinum into an existing Pd/Rh catalyst by substituting 50% of Pd with Pt is not the most efficient method towards Pt utilization. A shown in example 4 and FIGS. 5A, 5B and 5C, this approach typically leads to an increase in hydrocarbon, CO and nitrous oxides emission up to 30%, depending on the emissions type. Furthermore, this increase occurs regardless of whether the Pt and Pd are mixed on the same support or are present on different supports as long as there is no thermal or chemical fixation of the respective metals prior to catalyst wash coating.

The aforesaid drawback is resolved in the presently claimed invention catalytic articles A and B (Example 2 and Example 3), where the Pd and Pt are allocated on different support types and/or in different layers of the catalytic article. The Pd and Pt can be present in the same layer (Invention catalytic article B) as long as the metals are chemically or thermally fixed prior to slurry coating. Both designs demonstrate improvement over the reference system typically ranging from 20 to 30% in the case of the reported examples, emissions type dependent. The improvement is in both, mid-bed as well as in the tail pipe, which demonstrates the activity of the Pt-containing system itself, and not the compensation effect from the CC2 catalytic article. The results are shown in FIGS. 3, 4 and 6.

Reference throughout this specification to "one embodiment," "certain embodiments," "one or more embodiments" or "an embodiment" means that a particular feature, structure, material, or characteristic described in connection with the embodiment is included in at least one embodiment of the presently claimed invention. Thus, the appearances of the phrases such as "in one or more embodiments," "in certain embodiments," "in some embodiments," "in one embodiment," or "in an embodiment" in various places throughout this specification are not necessarily referring to the same embodiment of the presently claimed invention. Furthermore, the particular features, structures, materials, or characteristics may be combined in any suitable manner in one or more embodiments. All of the various embodiments, aspects, and options disclosed herein can be combined in all variations, regardless of whether such features or elements are expressly combined in a specific embodiment description herein. This presently claimed invention is intended to be read holistically such that any separable features or elements of the disclosed invention, in any of its various aspects and embodiments, should be viewed as intended to be combinable unless the context clearly dictates otherwise.

Although the embodiments disclosed herein have been described with reference to particular embodiments it is to be understood that these embodiments are merely illustrative of the principles and applications of the presently claimed invention. It will be apparent to those skilled in the art that various modifications and variations can be made to the methods and apparatus of the presently claimed invention without departing from the spirit and scope of the presently claimed invention. Thus, it is intended that the presently claimed invention include modifications and variations that are within the scope of the appended claims and their equivalents, and the above-described embodiments are presented for purposes of illustration and not of limitation. All patents and publications cited herein are incorporated by reference herein for the specific teachings thereof as noted, unless other statements of incorporation are specifically provided.

What is claimed is:

1. A tri-metallic layered catalytic article comprising:

a) a first layer comprising palladium supported on at least one of an oxygen storage component and an alumina component, wherein in the first layer, the palladium includes a first portion and a second portion respectively supported on different supports;

b) a second layer comprising platinum and rhodium, each supported on at least one of an oxygen storage component and a zirconia component, wherein in the second layer, the platinum and rhodium are respectively supported by different supports; and c) a substrate, wherein the weight ratio of palladium to platinum ranges from 1.0:0.4 to 1.0:2.0, and the weight ratio of palladium to platinum to rhodium is 1.0:0.7:0.1 to 1.0:1.3:0.3, and wherein the first layer is deposited on the substrate and the second layer is deposited on the first layer, the first layer and the second layer are formed by preparing and coating a first layer slurry and a second layer slurry, respectively, and wherein either palladium or platinum, or both are thermally or chemically fixed to a corresponding support prior to preparing the first layer slurry and the second layer slurry; and wherein the oxygen storage component of the first layer comprises ceria in an amount ranging from 20 wt. % to 50 wt. %, based on the total weight of the oxygen storage component, and the oxygen storage component of the second layer comprises ceria in an amount ranging from 5 wt. % to 15 wt. %, based on the total weight of the oxygen storage component.

2. The layered catalytic article according to claim 1, wherein the first layer comprises 80 wt. % to 100 wt. % of palladium with respect to the total amount of palladium present in the catalytic article.

3. The layered catalytic article according to claim 1, wherein the oxygen storage component of the first and second layer comprises ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, or any combination thereof, wherein the amount of the oxygen storage component ranges from 20 wt. % to 80 wt. %, based on the total weight of the first layer.

4. The layered catalytic article according to claim 1, wherein the alumina component comprises alumina, lanthana-alumina, ceria-alumina, ceria-zirconia-alumina, zirconia-alumina, lanthana-zirconia-alumina, baria-alumina, baria-lanthana-alumina, baria-lanthana-neodymia-alumina, or combinations thereof; and wherein the amount of the alumina component ranges from 10 wt. % to 90 wt. %, based on the total weight of the first layer.

5. The layered catalytic article according to claim 1, wherein the zirconia component comprises lanthana-zirconia and barium-zirconia.

6. The layered catalytic article according to claim 1, wherein the first layer is essentially free of platinum and rhodium, "essentially free of platinum and rhodium" refers to no external addition of platinum and rhodium in the first layer, or a fractional amount of platinum and rhodium in the first layer is less than 0.001%.

7. The layered catalytic article according to claim 1, wherein the first layer comprises at least one alkaline earth metal oxide comprising barium oxide, strontium oxide, or any combination thereof, in an amount ranging from 1.0 wt. % to 20 wt. %, based on the total weight of the first layer.

8. The layered catalytic article according to claim 1, wherein the zirconia component comprises at least 70 wt. % by weight of zirconia based on the total weight of the zirconia component.

9. The layered catalytic article according to claim 1, wherein the second layer further comprises palladium supported on an alumina component, wherein the amount of palladium ranges from 0.1 wt. % to 20 wt. %, based on the total weight of palladium present in the catalytic article.

10. The layered catalytic article according to claim 1, wherein the first layer is loaded with 1.0 g/ft$^3$ to 300 g/ft$^3$ of palladium supported on the alumina component and the oxygen storage component; and the second layer is loaded 1.0 g/ft$^3$ to 100 g/ft$^3$ of rhodium and 1.0 g/ft$^3$ to 300 g/ft$^3$ of platinum, each supported on the oxygen storage component, the zirconia component, or both.

11. The layered catalytic article according to claim 1, wherein the second layer comprises rhodium and platinum, each supported on the oxygen storage component, and palladium supported on the alumina component.

12. The layered catalytic article according to claim 1, wherein the substrate is a ceramic substrate, metal substrate, ceramic foam substrate, polymer foam substrate or a woven fibre substrate.

13. A process for the preparation of a layered catalytic article according to claim 1, wherein the process comprises:
- preparing the first layer slurry; depositing the first layer slurry on the substrate to obtain the first layer;
- preparing the second layer slurry; and
- depositing the second layer slurry on the first layer to obtain the second layer followed by calcination at a temperature ranging from 400 to 700° C., wherein the step of preparing the first layer slurry or second layer slurry comprises a technique chosen from incipient wetness impregnation, incipient wetness co-impregnation, and post-addition.

14. An exhaust system for internal combustion engines, the system comprising a layered catalytic article according to claim 1.

15. The exhaust system according to claim 14, wherein the system comprises a platinum group metal based three-way conversion (TWC) catalytic article and a layered catalytic article according to claim 1, wherein the platinum group metal based three-way conversion (TWC) catalytic article is positioned downstream from an internal combustion engine and the layered catalytic article is positioned downstream in fluid communication with the platinum group metal based three-way conversion (TWC) catalytic article.

16. The exhaust system according to claim 14, wherein the system comprises a platinum group metal based three-way conversion (TWC) catalytic article and a layered catalytic article according to claim 1, wherein the layered catalytic article is positioned downstream from an internal combustion engine and the platinum group metal based three-way conversion (TWC) catalytic article is positioned downstream in fluid communication with the three-way conversion (TWC) catalytic article.

17. A method of treating a gaseous exhaust stream comprising hydrocarbons, carbon monoxide, and nitrogen oxide, the method comprising contacting the exhaust stream with a layered catalytic article according to claim 1 or an exhaust system according to claim 14.

18. A method of reducing hydrocarbons, carbon monoxide, and nitrogen oxide levels in a gaseous exhaust stream, the method comprising contacting the gaseous exhaust stream with a layered catalytic article according to claim 1 or an exhaust system according to claim 14 to reduce the levels of hydrocarbons, carbon monoxide, and nitrogen oxide in the exhaust gas.

* * * * *